United States Patent
Liao et al.

(10) Patent No.: US 12,270,137 B2
(45) Date of Patent: Apr. 8, 2025

(54) METHOD FOR DECOLORIZING POLYESTER FABRIC

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Yu-Ti Tseng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 428 days.

(21) Appl. No.: 17/865,356

(22) Filed: Jul. 14, 2022

(65) Prior Publication Data
US 2023/0090987 A1    Mar. 23, 2023

(30) Foreign Application Priority Data
Sep. 13, 2021    (TW) .................................. 110133958

(51) Int. Cl.
| D06B 9/00 | (2006.01) |
| D06B 3/10 | (2006.01) |
| D06P 5/04 | (2006.01) |
| D06P 5/13 | (2006.01) |
| D06P 5/15 | (2006.01) |

(52) U.S. Cl.
CPC ............... *D06B 9/00* (2013.01); *D06B 3/10* (2013.01); *D06P 5/04* (2013.01); *D06P 5/137* (2013.01); *D06P 5/158* (2013.01); *D06B 2700/14* (2013.01)

(58) Field of Classification Search
None
See application file for complete search history.

(56) References Cited

U.S. PATENT DOCUMENTS

| 6,051,036 | A  | * | 4/2000 | Kusaki ...................... D06P 5/30 8/581 |
| 7,396,395 | B1 | * | 7/2008 | Chen .................... D06M 15/277 524/196 |
| 7,959,807 | B2 |   | 6/2011 | Mukai et al. |
| 2009/0061718 | A1 | * | 3/2009 | Seidling ............... C11D 3/3947 510/375 |
| 2009/0133200 | A1 | * | 5/2009 | Mukai ...................... C08J 11/24 8/440 |
| 2015/0059103 | A1 |   | 3/2015 | Liu et al. |

(Continued)

FOREIGN PATENT DOCUMENTS

| CN | 108779602 A | 11/2018 |
| CN | 108951233 A | 12/2018 |

(Continued)

*Primary Examiner* — Omair Chaudhri
(74) *Attorney, Agent, or Firm* — Li & Cai Intellectual Property Office

(57) ABSTRACT

A method for decolorizing a polyester fabric is provided, which includes: providing a dyed polyester fabric, in which a material of the dyed polyester fabric contains a dye and a water repellent; providing a composite solvent, in which the composite solvent includes propylene glycol methyl ether (PM) and acetic acid that are mixed together; and performing an extraction process, which includes using the composite solvent to wet the dyed polyester fabric and remove the dye and the water repellent from the material of the polyester fabric by extraction, so as to obtain a reduced polyester fabric.

8 Claims, 1 Drawing Sheet

(56) References Cited

U.S. PATENT DOCUMENTS

| | | | |
|---|---|---|---|
| 2016/0242475 A1* | 8/2016 | Uozumi | D06P 1/44 |
| 2016/0319481 A1* | 11/2016 | Cai | C09D 5/00 |
| 2019/0024305 A1 | 1/2019 | Ellis et al. | |
| 2020/0256009 A1 | 8/2020 | Altman et al. | |
| 2020/0270790 A1 | 8/2020 | Liao et al. | |
| 2022/0169786 A1* | 6/2022 | Takao | D06P 5/137 |
| 2023/0093536 A1 | 3/2023 | Liao et al. | |
| 2023/0303799 A1* | 9/2023 | Cascio | C08G 69/02 |
| 2024/0052130 A1* | 2/2024 | Yoon | D06P 1/67316 |

FOREIGN PATENT DOCUMENTS

| | | | | |
|---|---|---|---|---|
| CN | 110305012 A | | 10/2019 | |
| CN | 111607956 A | | 9/2020 | |
| JP | 2005255963 A | | 9/2005 | |
| JP | 201548570 A | | 3/2015 | |
| JP | 2020133089 A | | 8/2020 | |
| JP | 202341597 A | | 3/2023 | |
| KR | 20140142020 A | * | 12/2014 | |
| KR | 101962392 B1 | * | 3/2019 | |
| TW | I481762 B | | 4/2015 | |
| TW | 202031969 A | | 9/2020 | |
| WO | WO-2021013849 A1 | * | 1/2021 | C08J 11/06 |

\* cited by examiner

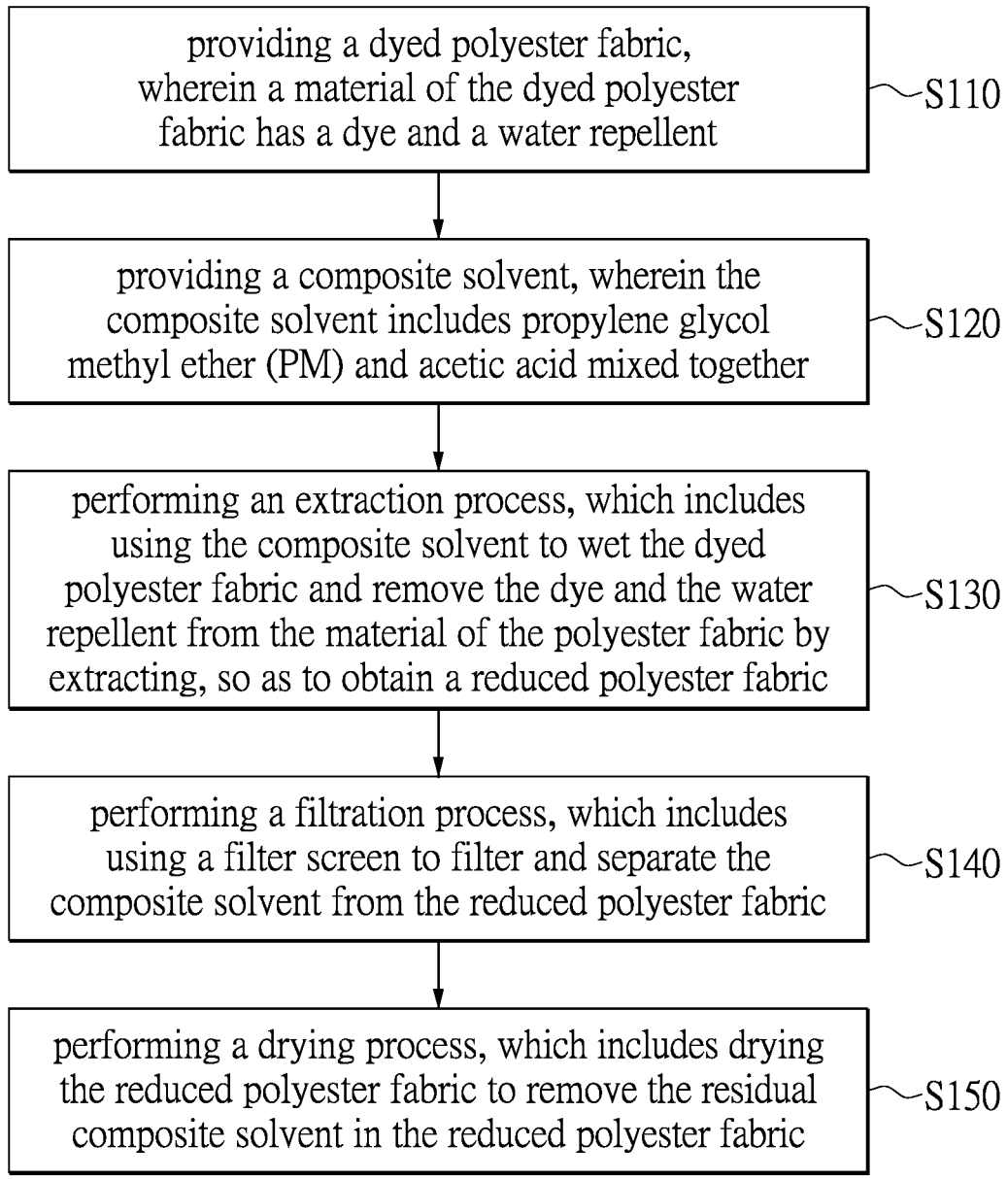

METHOD FOR DECOLORIZING POLYESTER FABRIC

CROSS-REFERENCE TO RELATED PATENT APPLICATION

This application claims the benefit of priority to Taiwan Patent Application No. 110133958, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a decolorization method, and more particularly to a method for decolorizing a polyester fabric.

BACKGROUND OF THE DISCLOSURE

A material of a dyed polyester fabric conventionally contains a dye and a water repellent that are considered impurities in a recycled polyester fabric. When recycling the polyester fabric, the dye and the water repellent adhered onto the material of the polyester fabric must be removed.

In the related art, solvent extraction methods can usually only remove the dye from the material of the polyester fabric, and are unable to effectively remove the water repellent from the material of the polyester fabric. As a result, the material of the polyester fabric may contain an excessive amount of the water repellant. Thus, the polyester fabric cannot be recycled, or problems such as poor recycling quality and limited applications may occur.

U.S. Pat. No. 7,959,807 discloses a method for recovering useful components from dyed polyester fibers. Although the method has a high dye removal efficiency and allows a recycled polyester fabric to appear white in color, the water repellent of the polyester fabric still cannot be completely removed after solvent extraction and pressure filtration. A residual concentration of the water repellent is about 10,000 ppm, which may affect the recycling quality and the application of the polyester fabric. For example, fiber breakage of recycled fibers may easily occur due to the impurities.

Taiwan Patent No. 1481762 provides a method of decolorizing a dyed polyester fiber, in which an evaporation gas of a solvent is used to extract the dye. In the method, a high dye extraction efficiency can be achieved, but there is the disadvantage of high energy consumption. Furthermore, this method is also unable to remove the water repellent, which can cause the water repellent to remain on the polyester fabric.

SUMMARY OF THE DISCLOSURE

In response to the above-referenced technical inadequacies, the present disclosure provides a method for decolorizing a polyester fabric.

In one aspect, the present disclosure provides a method for decolorizing a polyester fabric, which includes: providing a dyed polyester fabric, in which a material of the dyed polyester fabric contains a dye and a water repellent; providing a composite solvent, in which the composite solvent includes propylene glycol methyl ether (PM) and acetic acid mixed together; performing an extraction process, which includes using the composite solvent to wet the dyed polyester fabric and remove the dye and the water repellent from the material of the polyester fabric by extraction, so as to obtain a reduced polyester fabric.

Preferably, in the composite solvent, a weight ratio of the propylene glycol methyl ether to the acetic acid is from 5:95 to 95:5.

Preferably, the polyester fabric has a glass transition temperature. In the extraction process, the composite solvent is heated to an extraction temperature, so as to wet the polyester fabric and remove the dye and the water repellent from the material of the polyester fabric by extraction. The extraction temperature of the composite solvent is higher than the glass transition temperature of the polyester fabric.

Preferably, the glass transition temperature of the polyester fabric is not greater than 80° C., and the composite solvent is heated to the extraction temperature that is between 80° C. and 150° C. to wet the polyester fabric and extract the dye and the water repellent.

Preferably, in the extraction process, the extraction temperature of the composite solvent is lower than a boiling point of the propylene glycol methyl ether and/or a boiling point of the acetic acid.

Preferably, in the extraction process, the glass transition temperature of the polyester fabric is between 70° C. and 80° C. The extraction temperature of the composite solvent is between 100° C. and 120° C. The weight ratio of the propylene glycol methyl ether to the acetic acid is from 10:90 to 80:20.

Preferably, in the extraction process, an amount of the composite solvent is 8 to 30 times an amount of the dyed polyester fabric. An extraction time of the composite solvent to the dyed polyester fabric is between 0.5 hours and 3 hours. A number of times that the dyed polyester fabric is extracted by the composite solvent is from 1 to 6.

Preferably, in the dyed polyester fabric, the water repellent has a cross-linked polymer network structure, and the water repellent is at least one of a silicon (Si) containing water repellent, a fluorine (F) containing water repellent, a silicon and fluorine containing water repellent and a waterborne polyurethane (PU) water repellent. In the extraction process, the water repellent is removed by the acetic acid of the composite solvent.

Preferably, after the step of using the composite solvent to extract the dye and the water repellent of the polyester fabric, the method further includes: performing a filtration process, which includes using a filter screen to filter and separate the composite solvent from the reduced polyester fabric; and performing a drying process, which includes drying the reduced polyester fabric to remove the residual composite solvent in the reduced polyester fabric. A pore diameter of the filter screen is not greater than 5 cm.

Preferably, the reduced polyester fabric has an L value of not less than 60, and a content of the water repellent in the reduced polyester fabric is not greater than 200 ppm.

Therefore, in the method for decolorizing the polyester fabric provided by the present disclosure, by virtue of "providing a composite solvent, in which the composite solvent includes propylene glycol methyl ether (PM) and acetic acid that are mixed together" and "performing an extraction process, which includes using the composite solvent to wet the dyed polyester fabric and remove the dye and the water repellent from the material of the polyester fabric by extraction, so as to obtain a reduced polyester fabric," the dye and the water repellent of the polyester fabric can be effectively removed. In this way, the polyester fabric can be recycled more easily and has a good recycling quality.

Polyesters as described in the present disclosure are commonly known polyesters such as polyethylene terephthalate (PET). The polyesters are each a quasi-linear polymer obtained by a polycondensation reaction of a saturated dibasic acid and a dibasic alcohol. Due to different raw materials or intermediates, different kinds of polyesters are available. A common feature is that each chain link of macromolecules has an ester group (— COO—). The polyesters can be reprocessed to produce fibers, so as to be manufactured into fabrics. Polyester fibers can be manufactured into various fabrics (such as plain woven fabrics and knitted fabrics).

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for decolorizing a polyester fabric according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

[Method for Decolorizing Polyester Fabric]

In an embodiment of the present disclosure, a method for decolorizing a polyester fabric includes subjecting the polyester fabric to a temperature higher than its glass transition temperature (Tg). This allows molecules of fibers to slide freely relative to each other, so that the fibers become soft and loose (which is beneficial for extracting dyes through solvents). Accordingly, a decolorization effect can be achieved. Since polyester fibers have hydrophobicity, preferably, the solvents (e.g., propylene glycol methyl ether (PM)) have a boiling temperature higher than the Tg of the polyester fabric and are miscible with oil or water. Furthermore, not only can an acetic acid solvent depolymerize (destroy) a structure of a water repellent (so as to separate the water repellent from the polyester fabric), but the acetic acid solvent can also increase a dye extraction efficiency of the PM (so as to enhance the decolorization effect).

It should be noted that a material of a dyed polyester fabric conventionally contains a dye and a water repellent that are considered impurities in a recycled polyester fabric. When recycling the polyester fabric, the dye and the water repellent adhered onto the material of the polyester fabric must be removed. In the related art, solvent extraction methods can usually only remove the dye from the material of the polyester fabric, and are unable to effectively remove the water repellent from the material of the polyester fabric. As a result, the material of the polyester fabric may contain an excessive amount of the water repellant. Thus, the polyester fabric cannot be recycled, or problems such as poor recycling quality and limited applications may occur.

Reference is made to FIG. 1. In order to solve the above-mentioned problems, the method for decolorizing the polyester fabric provided in the embodiment of the present disclosure can concurrently and effectively remove the dye and the water repellent from the material of the polyester fabric. The method includes step S110, step S120, step S130, step S140, and step S150. It should be noted that a sequence of the steps described in the present embodiment and actual ways of operation can be adjusted according to practical requirements, and are not limited to those described in the present embodiment.

Step S110 includes: providing a recycled and dyed polyester fabric. A material of the polyester fabric has a dye and a water repellent.

More specifically, the material of the polyester fabric can be dyed with the dye such as to exhibit a certain color (e.g., black, red, and blue). Further, the polyester fabric can be treated with the water repellent, so as to have a water repellent function. Conventionally, the dye is mainly adhered onto fiber structures (especially non-crystalline areas) of the polyester fabric, and the water repellent is covered on the fiber structures and the dye.

The dye adhered onto the polyester fabric can be, for example, a natural dye or a synthetic dye. The water repellent has a cross-linked polymer network structure, and can be, for example, at least one of a silicon (Si) containing water repellent, a fluorine (F) containing water repellent, a silicon and fluorine containing water repellent and a waterborne polyurethane (PU) water repellent, but the present disclosure is not limited thereto.

In the present embodiment, the method for decolorizing the polyester fabric removes the dye and the water repellent through steps S120 to S150.

Step S120 includes: providing a composite solvent. The composite solvent includes propylene glycol methyl ether (PM) and acetic acid mixed together.

In order to allow the composite solvent to have a good extraction efficiency for the dye and the water repellent, the propylene glycol methyl ether and the acetic acid have an exemplary composition ratio. Specifically, in the composite solvent, a weight ratio of the propylene glycol methyl ether to the acetic acid is usually from 5:95 to 95:5, is preferably from 10:90 to 80:20, is more preferably from 70:30 to 90:10, and is most preferably from 80:20 to 90:10. That is, in an exemplary embodiment, an amount of the propylene glycol methyl ether is greater than an amount of the acetic acid. Preferably, the amount of the propylene glycol methyl ether is 2 to 10 times the amount of the acetic acid, but the present disclosure is not limited thereto.

Step S130 includes: performing an extraction process. The extraction process includes using the composite solvent to wet the dyed polyester fabric and remove the dye and the water repellent from the material of the polyester fabric by extraction, so as to obtain a reduced polyester fabric.

More specifically, the polyester fabric has a glass transition temperature. In the extraction process, the composite solvent is heated to an extraction temperature, so as to wet the polyester fabric and remove the dye and the water repellent from the material of the polyester fabric by extraction. The extraction temperature of the composite solvent is higher than the glass transition temperature of the polyester fabric. Therefore, the extraction efficiency of the composite solvent for the dye and the water repellent can be increased.

In one embodiment of the present disclosure, the glass transition temperature of the polyester fabric is not greater than 80° C., and is substantially between 70° C. and 80° C. (e.g., 75° C.).

In one embodiment of the present disclosure, the composite solvent is heated to the extraction temperature that is between 80° C. and 150° C., so as to wet the polyester fabric and extract the dye and the water repellent. The extraction temperature is preferably between 100° C. and 140° C., and is more preferably between 100° C. and 120° C., but the present disclosure is not limited thereto.

That is, in the extraction process, the extraction temperature of the composite solvent (e.g., 100° C. to 120° C.) is preferably higher than the glass transition temperature of the polyester fabric (e.g., 70° C. to 80° C.), so as to increase the extraction efficiency of the composite solvent for the dye and the water repellent. Furthermore, the extraction temperature of the composite solvent (e.g., 100° C. to 120° C.) is preferably lower than a boiling point (e.g., 120° C.) of the propylene glycol methyl ether and a boiling point (e.g., 118° C.) of the acetic acid, so that the composite solvent can extract the dye and the water repellent under a normal pressure. However, the present disclosure is not limited thereto.

In one embodiment of the present disclosure, an amount of the composite solvent is 8 to 30 times an amount of the dyed polyester fabric, and is preferably 10 to 15 times the amount of the dyed polyester fabric. In one embodiment of the present disclosure, an extraction time of the composite solvent to the dyed polyester fabric is between 0.5 hours and 3 hours, and is preferably between 1 hour and 2 hours. In one embodiment of the present disclosure, a number of times the dyed polyester fabric is extracted by the composite solvent is from 1 to 6, and is preferably from 3 to 6. It is worth mentioning that in each extraction process, a new and unused composite solvent is used to extract the dye and the water repellent.

It is worth mentioning that in the above-mentioned composite solvent, the acetic acid is mainly used to remove the water repellent adhered onto the polyester fabric. More specifically, the acetic acid can serve as a catalyst for hydrolysis, and can be used to hydrolyze the water repellent having a cross-linked polymer network structure or to hydrolyze a silane of a molecular structure of the water repellent. The propylene glycol methyl ether is mainly used to remove the dye adhered onto the polyester fabric.

More specifically, the propylene glycol methyl ether and the acetic acid can complement each other. The propylene glycol methyl ether can serve as a surfactant, so that the composite solvent can quickly enter into the fiber structures of the polyester fabric, thereby producing wetting and swelling effects with respect to the polyester fibers. Furthermore, the propylene glycol methyl ether can assist the acetic acid in having a greater degree of contact with the water repellent, so as to increase a removal efficiency for the water repellent.

The propylene glycol methyl ether is a good cosolvent and is soluble in water and oil phases. The dye is mainly adhered onto the non-crystalline areas of the polyester fabric. The propylene glycol methyl ether has good affinity with the non-crystalline areas of the polyester fabric, and can thus effectively remove the dye from the polyester fabric. In addition, since the acetic acid has a higher polarity and has a higher affinity with the dye, the acetic acid can assist the propylene glycol methyl ether in quickly removing the dye from the polyester fabric.

According to the above-mentioned configuration, the composite solvent of the present embodiment has a lower extraction temperature compared to a conventional extracting solvent, which allows reduction of energy consumption. Further, the fiber structures of the polyester fabric are less likely to be destroyed. Since the extraction temperature of the composite solvent of the present embodiment is higher than the glass transition temperature of the polyester fabric, the composite solvent can help soften the fiber structures of the polyester fabric. Accordingly, the composite solvent can enter into the fiber structures of the polyester fabric more easily, so as to increase the extraction efficiency for the dye and the water repellent. In addition, the composite solvent of the present embodiment contains the propylene glycol methyl ether (PM) and the acetic acid as main components, which have advantages of low cost and being less likely to cause harm to the human body.

On the other hand, since the extraction temperature of the composite solvent is higher than the glass transition temperature of the polyester fabric (e.g., a PET fabric), the propylene glycol methyl ether can remove the dye from the fiber structures of the polyester fabric. However, the solvents (such as the propylene glycol methyl ether) cannot dissolve or destroy the structure of the water repellent due to its cross-linked polymer network structure. Different from the conventional extracting solvent, a composite formula of the composite solvent in the present embodiment is to add the acetic acid to the propylene glycol methyl ether. The acetic acid can destroy the molecular structure of the water repellent at a temperature higher than the glass transition temperature of the polyester fabric, so as to remove the water repellent from the polyester fabric. Furthermore, the composite solvent (PM/acetic acid) can be recycled and reused through a heating evaporation process or an activated carbon filtration process.

Compared to conventional techniques for extracting the dye from the polyester fabric, the method for decolorizing the polyester fabric provided in the embodiment of the present disclosure has lower energy consumption and allows the reduced polyester fabric to have a higher quality.

Step S140 includes: performing a filtration process. The filtration process includes using a filter screen to filter and separate the composite solvent from the reduced polyester fabric.

In the filtration process, a pore diameter of the filter screen is not greater than 5 cm, is preferably not greater than 3 cm, and is more preferably not greater than 1 cm. Therefore, the composite solvent and the polyester fabric can be effectively separated from each other. It is worth mentioning that, in the filtration process, the composite solvent carries the dye and the water repellent when passing through the filter screen. The composite solvent can be further separated from the dye and the water repellent through the heating evaporation process or the activated carbon filtration process, so that the composite solvent can be recycled and reused. Furthermore, the reduced polyester fabric will remain on the filter screen for subsequent processing.

Step S150 includes: performing a drying process. The drying process includes drying the reduced polyester fabric to remove the residual composite solvent in the reduced polyester fabric.

More specifically, in the drying process, the reduced polyester fabric can be placed in an oven or in a dry environment to be dried naturally, and the present disclosure is not limited thereto.

According to the above-mentioned configuration, an L value of the reduced polyester fabric is not less than 60, is preferably not less than 75, and is more preferably not less than 85. Furthermore, the reduced polyester fabric has a value between −1 and 1 and a b value between −4 and 4. In terms of a residual concentration of the water repellent, a content of the water repellent in the reduced polyester fabric is not greater than 200 ppm, and is preferably not greater than 100 ppm.

It should be noted that, based on nonlinearly compressed CIE XYZ color space coordinates, a Lab color space is a color-opponent space (in which a dimension L represents lightness, and a and b represent color-opponent dimensions).

In certain embodiments of the present disclosure, the method for decolorizing the polyester fabric uses a composite solvent (which includes 90% of PM and 10% of acetic acid) to wash a dyed polyester fabric 3 times (one hour for each time) at an extraction temperature of 115° C. As a result, the reduced polyester fabric has an L value of about 80 to 85, an a value of about 0.2 to 0.6, and a b value of about 2.5 to 3.5, but the present disclosure is not limited thereto.

[Composite Solvent]

The above description relates to the method for decolorizing the polyester fabric according to the embodiment of the present disclosure. The embodiment of the present disclosure further provides a composite solvent, which is suitable for performing a decolorization process on a dyed polyester fabric. A material of the dyed polyester fabric contains a dye and a water repellent. The composite solvent includes propylene glycol methyl ether (PM) and acetic acid mixed together. In the composite solvent, a weight ratio of the propylene glycol methyl ether to the acetic acid is usually from 5:95 to 95:5, is preferably from 10:90 to 80:20, is more preferably from 70:30 to 90:10, and is most preferably from 80:20 to 90:10. That is, in an exemplary embodiment, an amount of the propylene glycol methyl ether is greater than an amount of the acetic acid, and the amount of the propylene glycol methyl ether is 2 to 10 times the amount of the acetic acid. However, the present disclosure is not limited thereto.

[Experimental Test Data]

Examples 1 to 6: a polyester fabric containing a dye and a water repellent (L=22%, water repellent content: 10,000 ppm) and a PM/acetic acid composite solvent are put into a 1 L beaker, and are heated and stirred for extracting the water repellent and the dye from the polyester fabric. Process conditions and quality results of reduced polyester fabrics after extraction are shown in Table A1 and Table A2 below.

Comparative Examples 1 to 6: a polyester fabric containing a dye and a water repellent (L=22%, water repellent content: 10,000 ppm) and a conventional extracting solvent are put into a 1 L beaker, and are heated and stirred for extracting the water repellent and the dye from the polyester fabric. Process conditions and resulting quality of reduced polyester fabrics after extraction are shown in Table B1 and Table B2 below.

TABLE A1

| | Feeds (g) | | | Process conditions | | |
| --- | --- | --- | --- | --- | --- | --- |
| | Polyester fabric | PM | Acetic acid | Temperature (° C.) | Time (hr) | Number of times of extraction |
| Example 1 | 10 | 180 | 20 | 120 | 1 | 3 |
| Example 2 | 10 | 180 | 20 | 120 | 0.5 | 4 |
| Example 3 | 10 | 180 | 20 | 110 | 2 | 3 |
| Example 4 | 10 | 360 | 40 | 120 | 1 | 2 |
| Example 5 | 10 | 360 | 40 | 110 | 0.5 | 2 |
| Example 6 | 10 | 360 | 40 | 120 | 2 | 3 |

TABLE A2

Quality results of reduced polyester fabrics after extraction

| | Color space of reduced polyester fabrics | | | Content of water repellent (ppm) |
| --- | --- | --- | --- | --- |
| | L (%) | a | b | |
| Example 1 | 85 | 0.5 | 2.6 | 65 |
| Example 2 | 86 | 0.4 | 2.4 | 47 |
| Example 3 | 81 | 0.3 | 3.4 | 84 |
| Example 4 | 84 | 0.5 | 3.2 | 79 |
| Example 5 | 81 | 0.4 | 3.2 | 93 |
| Example 6 | 89 | 0.1 | 2.7 | 25 |

TABLE B1

|  | Feeds (g) | | | Process conditions | | |
| --- | --- | --- | --- | --- | --- | --- |
|  | Polyester fabric | Dimethylbenzene | Ethylene glycol (EG) | Temperature (° C.) | Time (hr) | Number of times of extraction |
| Comparative Example 1 | 10 | 200 | 0 | 120 | 1 | 3 |
| Comparative Example 2 | 10 | 100 | 100 | 120 | 0.5 | 4 |
| Comparative Example 3 | 10 | 0 | 200 | 110 | 2 | 3 |
| Comparative Example 4 | 10 | 400 | 0 | 120 | 1 | 2 |
| Comparative Example 5 | 10 | 200 | 200 | 110 | 0.5 | 2 |
| Comparative Example 6 | 10 | 0 | 400 | 120 | 2 | 3 |

TABLE B2

Quality results of reduced polyester fabrics after extraction

|  | Color space of reduced polyester fabrics | | | Content of water repellent (ppm) |
| --- | --- | --- | --- | --- |
|  | L (%) | a | b |  |
| Comparative Example 1 | 81 | 0.9 | 3.8 | 3,792 |
| Comparative Example 2 | 83 | 0.8 | 4.2 | 3,474 |
| Comparative Example 3 | 79 | 1.2 | 5.7 | 5,139 |
| Comparative Example 4 | 80 | 1.4 | 4.5 | 5,513 |
| Comparative Example 5 | 78 | 1.7 | 3.4 | 5,817 |
| Comparative Example 6 | 83 | 0.5 | 3.7 | 3,280 |

It can be observed from the experimental test data that, in Examples 1 to 6 that use the PM/acetic acid composite solvent to extract the water repellent and the dye from the polyester fabric, the reduced polyester fabric is allowed to have a lower content of the water repellent (not greater than 100 ppm). In contrast, for Comparative Examples 1 to 6 that use the conventional extracting solvent (e.g., dimethylbenzene or EG) to extract the water repellent and the dye from the polyester fabric, the reduced polyester fabric still has a higher content of the water repellent (greater than 3000 ppm).

[Beneficial Effects of the Embodiments]

In conclusion, in the method for decolorizing the polyester fabric provided by the present disclosure, by virtue of "providing a composite solvent, in which the composite solvent includes propylene glycol methyl ether (PM) and acetic acid that are mixed together" and "performing an extraction process, which includes using the composite solvent to wet the dyed polyester fabric and remove the dye and the water repellent from the material of the polyester fabric by extraction, so as to obtain a reduced polyester fabric," the dye and the water repellent of the polyester fabric can be effectively removed. In this way, the polyester fabric can be recycled more easily and has a good recycling quality.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for decolorizing a polyester fabric, comprising:
   providing a dyed polyester fabric, wherein a material of the dyed polyester fabric contains a dye and a water repellent;
   providing a composite solvent, wherein the composite solvent includes propylene glycol methyl ether (PM) and acetic acid that are mixed together, wherein in the composite solvent, a weight ratio of the propylene glycol methyl ether to the acetic acid is from 5:95 to 95:5; and
   performing an extraction process, which includes using the composite solvent to wet the dyed polyester fabric and remove the dye and the water repellent from the material of the polyester fabric by extraction, so as to obtain a reduced polyester fabric.

2. The method according to claim 1, wherein the polyester fabric has a glass transition temperature; wherein in the extraction process, the composite solvent is heated to an extraction temperature, so as to wet the dyed polyester fabric and remove the dye and the water repellent from the material of the polyester fabric by extraction; wherein the extraction temperature of the composite solvent is higher than the glass transition temperature of the polyester fabric.

3. The method according to claim 2, wherein the glass transition temperature of the polyester fabric is not greater than 80° C., and the composite solvent is heated to the extraction temperature that is between 80° C. and 150° C., so as to wet the dyed polyester fabric and extract the dye and the water repellent.

4. The method according to claim 3, wherein in the extraction process, the extraction temperature of the composite solvent is lower than a boiling point of the propylene glycol methyl ether and/or a boiling point of the acetic acid.

5. The method according to claim 4, wherein in the extraction process, the glass transition temperature of the polyester fabric is between 70° C. and 80° C., the extraction temperature of the composite solvent is between 100° C. and 120° C., and a weight ratio of the propylene glycol methyl ether to the acetic acid is from 10:90 to 80:20.

6. The method according to claim 1, wherein in the dyed polyester fabric, the water repellent has a cross-linked polymer network structure, and the water repellent is at least one of a silicon (Si) containing water repellent, a fluorine (F) containing water repellent, a silicon and fluorine containing water repellent and a waterborne polyurethane (PU) water repellent; wherein in the extraction process, the water repellent is removed by the acetic acid of the composite solvent.

7. The method according to claim 1, wherein, after the step of using the composite solvent to extract the dye and the water repellent of the dyed polyester fabric, the method further comprises:

performing a filtration process, which includes using a filter screen to filter and separate the composite solvent from the reduced polyester fabric, wherein a pore diameter of the filter screen is not greater than 5 cm; and performing a drying process, which includes drying the reduced polyester fabric to remove the residual composite solvent in the reduced polyester fabric.

8. The method according to claim 1, wherein the reduced polyester fabric has an L value of not less than 60, and a content of the water repellent in the reduced polyester fabric is not greater than 200 ppm.

* * * * *